Aug. 15, 1967     G. SEULEN ETAL     3,336,459
METHOD OF AND APPARATUS FOR ELECTRO-INDUCTIVELY
HEATING THE CHAIN LINKS OF THE TRACK CHAINS
OF CATERPILLAR OR TRACK-LAYING VEHICLES
Filed Feb. 24, 1965     4 Sheets-Sheet 1

Inventors
Gerhard Seulen
Hermann Kuhlbars
By Cushman, Darby & Cushman
Attorneys

Inventors
Gerhard Seulen
Hermann Kuhlbars
By Cushman, Darby & Cushman
Attorneys

United States Patent Office 3,336,459
Patented Aug. 15, 1967

3,336,459
METHOD OF AND APPARATUS FOR ELECTRO-INDUCTIVELY HEATING THE CHAIN LINKS OF THE TRACK CHAINS OF CATERPILLAR OR TRACK-LAYING VEHICLES
Gerhard Seulen, Remscheid, and Hermann Kuhlbars, Wuppertal-Elberfeld, Germany, assignors to Deutsche Edelstahlwerke Aktiengesellschaft, Krefeld, Germany, and Allgemeine Elektricitats-Gesellschaft, Berlin-Grunewald, Germany
Filed Feb. 24, 1965, Ser. No. 434,836
Claims priority, application Germany, Feb. 26, 1964, D 43,732
4 Claims. (Cl. 219—10.43)

ABSTRACT OF THE DISCLOSURE

An apparatus for electro-inductively heating a chain link of a track-laying vehicle in order to harden its running surface without overheating the edges which are to remain soft having conductor branches disposed above the chain link and reciprocable transversely of the longitudinal axis of the chain link and having other conductor branches disposed from and reciprocating towards and away from the sides of the chain link.

A method of electro-inductively heating the side faces and bridging face of a chain link in which conductor branches are reciprocated across the bridging face in a transverse direction to the longitudinal axis of the bridging face and in which other conductor branches are reciprocated towards and away from the side faces of the chain link.

---

The invention relates to a method of and apparatus for electro-inductively heating the chain links of the track chains of articulated track or track-laying vehicles, particularly for the purpose of hardening their running surfaces.

Such chain links are required to form the track chains of track-laying vehicles such as tractors, building machinery, cranes and the like and, since they are exposed to considerable wear by contact with sand, stones, earth and the like, the surfaces that are likely to wear are submitted to a surface hardening treatment. The surface portions which are to be hardened are raised to hardening temperature either by gas flames or by electro-induction.

The difficulty experienced in hardening is that a hardened layer of maximum possible depth is required to permit the chain links to remain serviceable even after they have suffered a measurable amount of wear. On the other hand, the edges and corner sections must not be hardened excessively.

Figure 1:
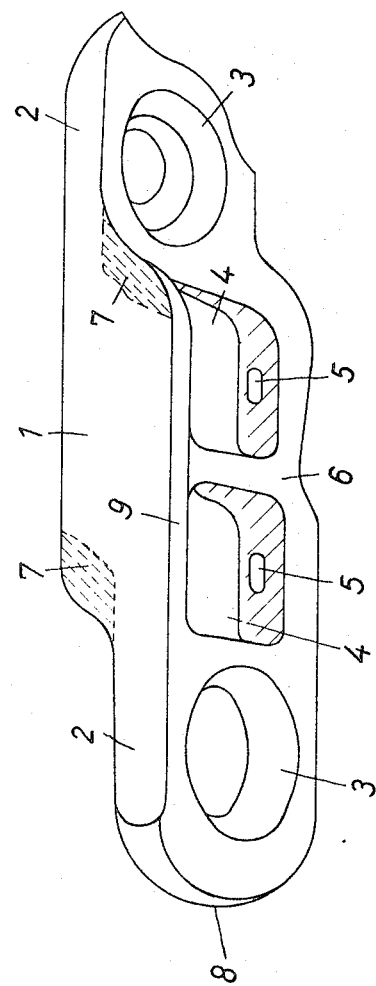

In order that the difficulties that are involved may be more readily understood and also in order to identify the parts that are submitted to surface hardening, reference is made to the perspective illustration in FIG. 1. The chain links have a running surface comprising a wide middle portion 1 and two relatively offset narrow connecting portions 2. These connecting portions contain the holes 3 for the link pins and bushes for joining the chain members together. In the completed chain the connecting portions of the chain links lie side by side. It will be understood that apart from holes 3 under the running surface further openings 4 are also provided which contain holes 5 for bolting the treads, which are not shown, to the chain links. The two openings 4 are separated by a web 6.

The running faces 1 and 2 which are engaged by the rollers of the track-laying vehicle must be hardened. However, care must be taken not to harden the portions 7 indicated by shading or at least to harden them to a less extent. Furthermore, it is intended that the hardened zones in portions 1, 2, 8 and 9 should agree with the contours without causing the edges to be overheated.

A known method is to harden the running surface 1/2 by the progressive feeding method, burners or inductors being used to provide the heat. For inductive heating stationary inductors are generally used, followed in the direction of feed by quenching sprays as is otherwise also well known and conventional. The chain links are hinged together as they would be in subsequent use and thus fed through the induction heating plant. In this connection it is also known to make use of heating conductor loops arranged across the direction of feed and to adapt them to the contours of the chain member by bending them downwards over the side. Another known arrangement is to provide conductors of meandering shape. Whichever type of inductor is used it is known and the general practice to mount magnetic yokes on the conductors in order to provide a desired distribution of the heating effect.

In the contemplated case the application of the progressive hardening technique is open to one objection, namely that the maximum hardness attainable by the unalloyed carbon steel used for such chain links cannot be successfully reached because quenching cannot be performed with optimum efficiency. This is because the surface of the work can cool to some extent before it reaches the quenching spray. Very abrupt quenching is therefore impossible. Morevore, it is also impossible to protect the edges adequately from overheating and portions 7 (FIG. 1) are unavoidably hardened to an extent which is most undesirable and which even involves the risk of cracking, etc., these portions. In many cases the procedure adopted in practice therefore includes inductively reheating and annealing these undesirably hardened portions 7. This additional operational step is naturally not wanted because it renders the manufacture of such parts in a production line far more difficult.

In view of the desired maximum hardness and the depth of the hardened layer it is desirable to use an overall surface heating technique because this permits the portions of the surface that are to be hardened to be raised to hardening temperature at the same time and to be quenched immediately with a minimum period of delay.

It is the object of the present invention to provide apparatus that will overcome all the difficulties involved in progressive heating by using an overall surface hardening technique and more particularly that will permit the edges not to be overheated and that will leave the corner sections soft.

According to the invention this problem is solved by the provision of two elongated conductor branches through which the current flows in the same direction and which are located side by side facing the surface portions that are to be hardened. The return branches are placed on the sides of the workpieces in such a way that the inductor which is moved in reciprocatory motion in a direction normal to the length of the work can sweep across the entire running face of the workpiece whereas the coupling clearance on the side faces of the workpiece changes. The reciprocating movement ensures an even distribution of temperature across the upper face of the work and that the side faces will be raised to hardening temperature in a manner conforming with their contours without incurring the risk of overheating.

In the further development of the inventive idea the elongated conductor branches are angled away short of the endangered parts of the surface. At this point they connect with the current supply leads or with the return conductors on the sides.

Figure 2:
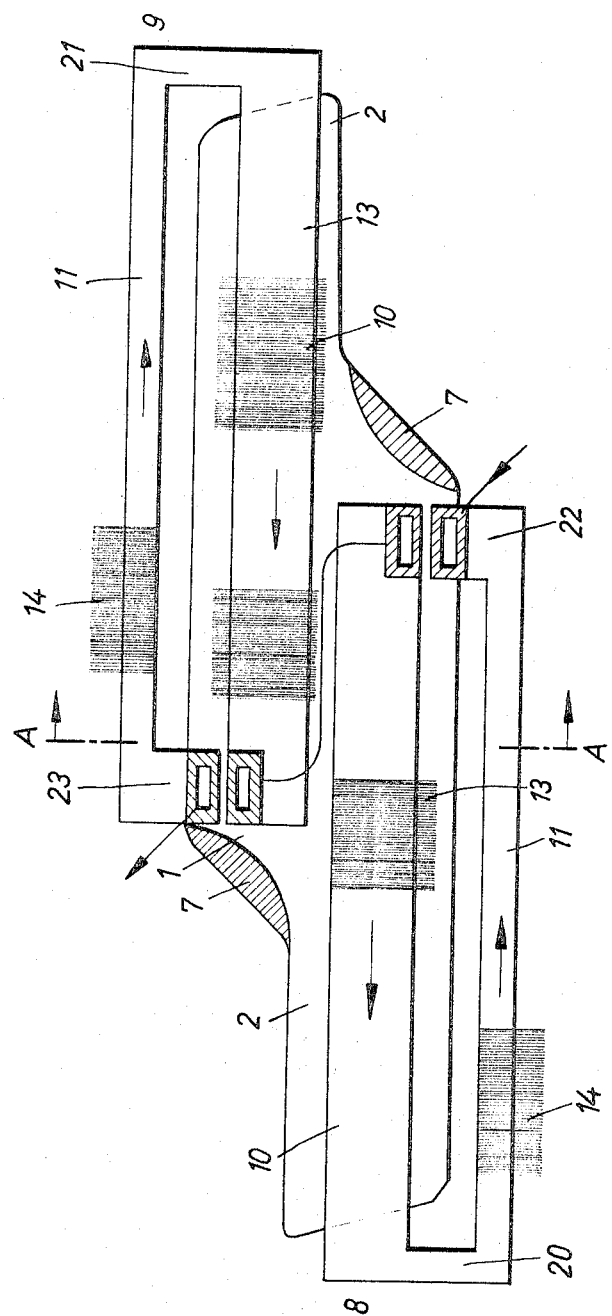
Figure 3:
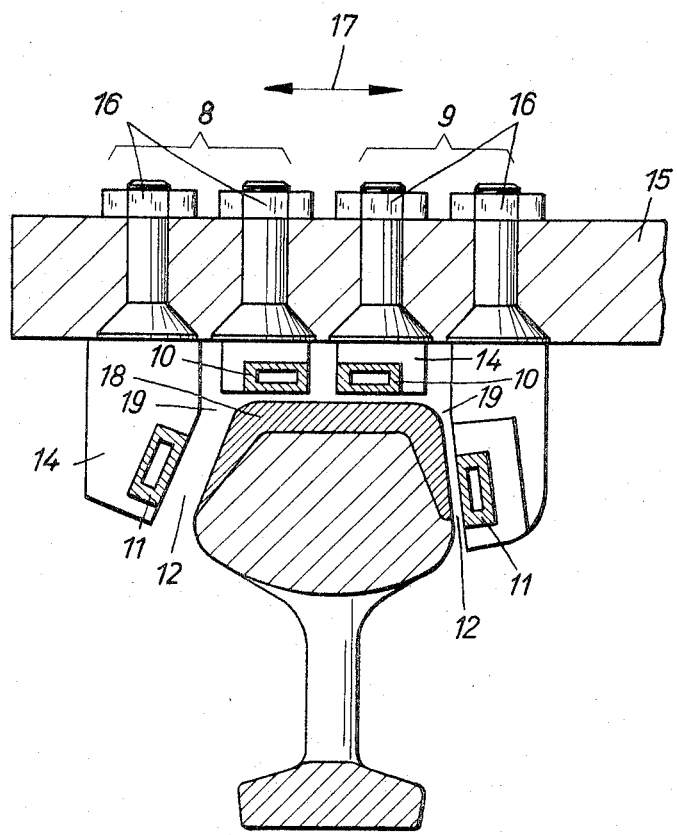
Figure 4:
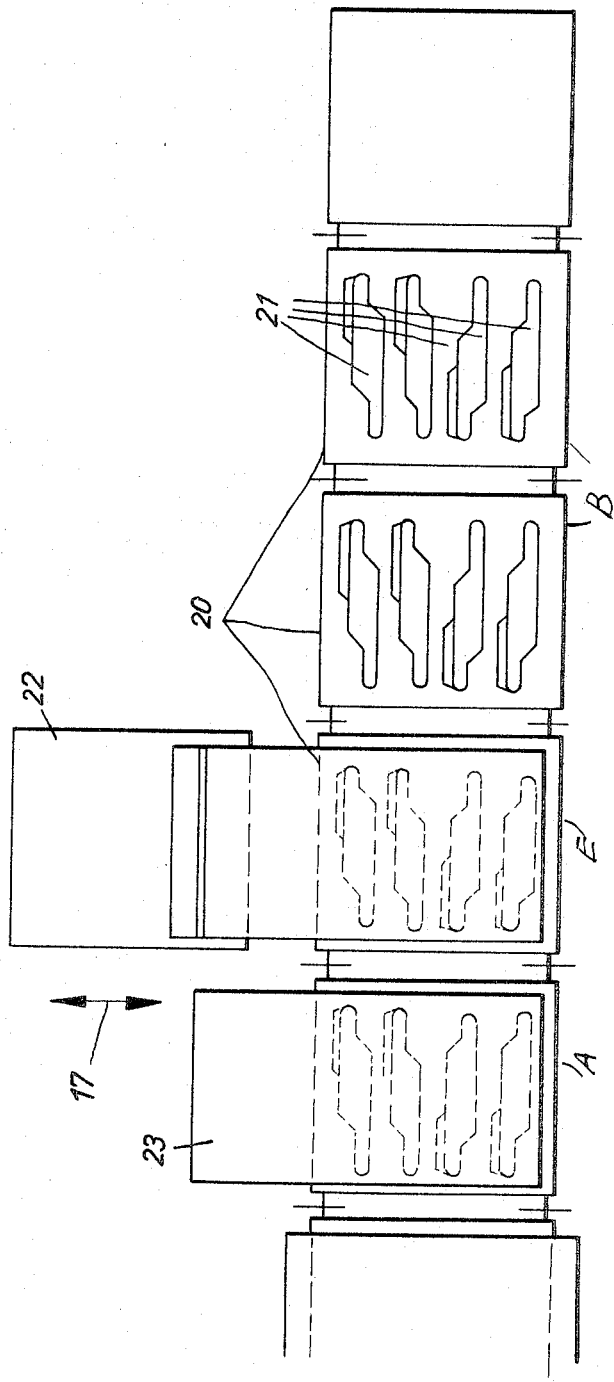

A preferred embodiment of the invention is illustratively shown in FIGS. 2 to 4 in which FIG. 2 is a view of the inductors, FIG. 3 is a section taken on the line A—A in FIG. 2, and FIG. 4 is a schematic plan view of the entire plant.

FIG. 2 includes a plan view of the workpiece whose running face is to be hardened. Only the wide portion 1 and the two connecting extensions 2 can be seen. The portions 7 which are to remain soft are indicated by shading. For treating such a chain link two inductors 8 and 9 are provided which are mirror symmetrically located and electrically conveniently connected in series. However, there would be no objection to connecting them in parallel. Each of these inductors 8 and 9 comprises an elongated conductor branch 10. The conductor branches 10 are located side by side and the current flows through them in the same direction. The return conductors 11 are located next to the side faces 12 of the chain link. As indicated at 13 and 14 the conductors 10 as well as the conductors 11 are provided with laminar yokes in a manner known to the art for the purpose of evenly distributing the field as desired.

From FIG. 3 it will be seen that the two inductors 8 and 9 are secured by screw means 16 to a common carrier plate 15, made for instance of plastics, hard fibre or the like. This plate 15 may also carry and support the electrical supply leads from the transformer to the inductors. It will further be understood from FIG. 3 that the lateral clearance of the two inductor branches 11 is such that the entire assembly can be reciprocated in the direction indicated by the two arrows 17. The result of this reciprocating motion is that the inductor branches 10 continuously sweep across the entire surface although as such they are narrower than the heated surface. The two return conductors 11 act on the side faces 12, but owing to the reciprocatory movement the coupling clearance between these conductors and the side faces continually varies. FIG. 3 illustrates the conductors in their extreme left hand position. The arrangement proposed by the invention permits a hardening pattern to be produced roughly as indicated in FIG. 3 at 18 by close shading. This ensures that the longitudinal edges at 19 will not be overheated.

A further development of the invention ensures that the portions at 7 (FIG. 2) remain soft and that they need not be annealed after they have been hardened. To this end the conductor branches extending along the length of the chain link and carrying current in the same direction are connected to a current supply lead by an off-angled portion which extends perpendicularly to said branches at a point of the surface short of the endangered zone 7. Naturally the current supply leads could be located at the points 20 and 21 and normal current conductors provided at 22 and 23. In either case the path of the induced heating current will thus be made to close short of the endangered surface portions 7 which will therefore be safeguarded from damage.

In practice it will be advisable to use the apparatus proposed by the invention in plant constructed as illustrated in FIG. 4. In this plant a horizontal conveyor is provided, comprising separate conveyor members 20 into which the chain links whose running faces are to be hardened are inserted or upon which they are carried on pins. Up to four such chain links may be mounted on each conveyor member side by side, as indicated at 21. Consequently a plate of the kind illustrated in FIG. 3 at 15 will carry four pairs of inductors 8/9 side by side. This carrier plate is then connected in suitable manner to a transformer 22 which together with the plate performs reciprocating motions during the heating up period in the direction of arrows 17. This plant is operated by loading the conveyor members 20 at B. At E the workpieces are heated, whereas at A a quenching sprayer 23 is mounted above the conveyor for quenching the surfaces that are to be hardened. Since the conveyor operates like a paternoster the workpieces drop off conveyor member 20 at the point of return. It will be understood that the conveyor advances intermittently in steps, so that the workpieces remain at E for a sufficient length of time to be heated. The feed motion between the stationary periods should be rapid to ensure that the time interval between the work attaining hardening temperature at E and being quenched at A is as short as possible. The means required for this purpose, such as time controlled relays and stepping gear, are well known to the art.

Instead of providing a conveyor operating in the manner of a paternoster a turntable could be provided and arranged to be indexed under the inductors whilst the inductors themselves perform reciprocatory motions in the radial direction of the turntable. The turntable would be operated with the same effect as the paternoster conveyor.

What we claim is:

1. Apparatus for electro-inductively heating a chain link for the track chain of a articulated track or tracklaying vehicle in order to harden its running surface which includes a face having a relatively wide portion and two narrower end portions that are relatively offset from the longitudinal axis of said surface, without overheating the edges which are to remain softer, comprising inductor means providing two elongated conductor branches arranged so that the current will flow through them in the same direction in side-by-side relation so as to be adapted to face the said face of the said surface that is to be heated and providing return branches which are adapted to be arranged on the side faces of the said surface, said inductor means being reciprocable transversely to the longitudinal axis of the link during overall heating of said surface and thus across the said first face while continuously varying the coupling clearances between the said return branches and the said side faces.

2. Apparatus according to claim 1, in which said narrower end portions and the said wider portion form shoulders on opposite side of the medial longitudinal axis and each said elongated branch terminates short of the corresponding shoulder and is there angled off to join the corresponding one of said lateral return branches to prevent the said shoulders from being undesirably heated.

3. The method of electro-inductively heating side faces and a bridging face of a chain link or other workpiece where the said bridging face is shouldered down to narrower portions at each end offset on opposite sides of the longitudinal axis of said face, which comprises reciprocating across the said bridging face and in near relation thereto elongated conductor portions of longitudinally staggered inductors provided with return branches disposed opposite the sides of the workpiece, so that while said elongated conductor portions traverse the said bridging face, the return branches are continuously moved towards and away from the side faces to vary the coupling clearances between the said return branches and the said side faces.

4. The method according to claim 3, in which the inner ends of said elongated conductor portions terminate a little short of the shoulders.

References Cited

UNITED STATES PATENTS 2,566,678   9/1951   Riegel et al. _____ 148—146

FOREIGN PATENTS 1,028,389   5/1966   Great Britain.

RICHARD M. WOOD, *Primary Examiner.*

L. H. BENDER, *Assistant Examiner.*